United States Patent [19]
Lahalih et al.

[11] Patent Number: 4,797,433
[45] Date of Patent: * Jan. 10, 1989

[54] UTILIZATION OF MELAMINE WASTE EFFLUENT

[75] Inventors: Shawqui Lahalih, Rique; Ma'mun Absi-Halabi, Salmia, both of Kuwait

[73] Assignee: Kuwait Institute for Scientific Research, Safat, Kuwait

[*] Notice: The portion of the term of this patent subsequent to Jun. 30, 2004 has been disclaimed.

[21] Appl. No.: 899,889

[22] Filed: Aug. 25, 1986

Related U.S. Application Data

[62] Division of Ser. No. 719,158, Apr. 2, 1985, Pat. No. 4,663,387.

[51] Int. Cl.$^4$ .................. C08L 61/28; C08G 12/30; C08J 3/18
[52] U.S. Cl. .................................. 524/3; 524/6; 524/650
[58] Field of Search .................. 524/3, 6, 650

[56] References Cited

U.S. PATENT DOCUMENTS

| 3,661,829 | 5/1972 | Aignesberger | 260/29.4 R |
| 3,784,648 | 1/1974 | Bergmeister | 524/3 |
| 3,827,992 | 8/1974 | Aignesberger | 260/21 |
| 3,985,696 | 10/1976 | Aignesberger | 260/29.4 R |
| 4,677,139 | 6/1987 | Lahalih et al. | 524/843 |

Primary Examiner—Paul R. Michl
Assistant Examiner—Lee C. Wright
Attorney, Agent, or Firm—Bacon & Thomas

[57] ABSTRACT

Thermally stable water soluble resins are prepared in a multistep process by reacting the waste solids from the mother liquor waste stream of a melamine manufacturing plant with an aldehyde and a sulfonating agent under controlled conditions of pH and temperature. The resin compositions are useful, for example, as superplasticizing agents for concrete admixtures, as mud drilling additives, and in the paper and textile industry. The process not only provides useful resin compositions, but also recovers solid wastes which are considered to be a major contributor to the pollution problems of melamine manufacturing plants.

4 Claims, 2 Drawing Sheets

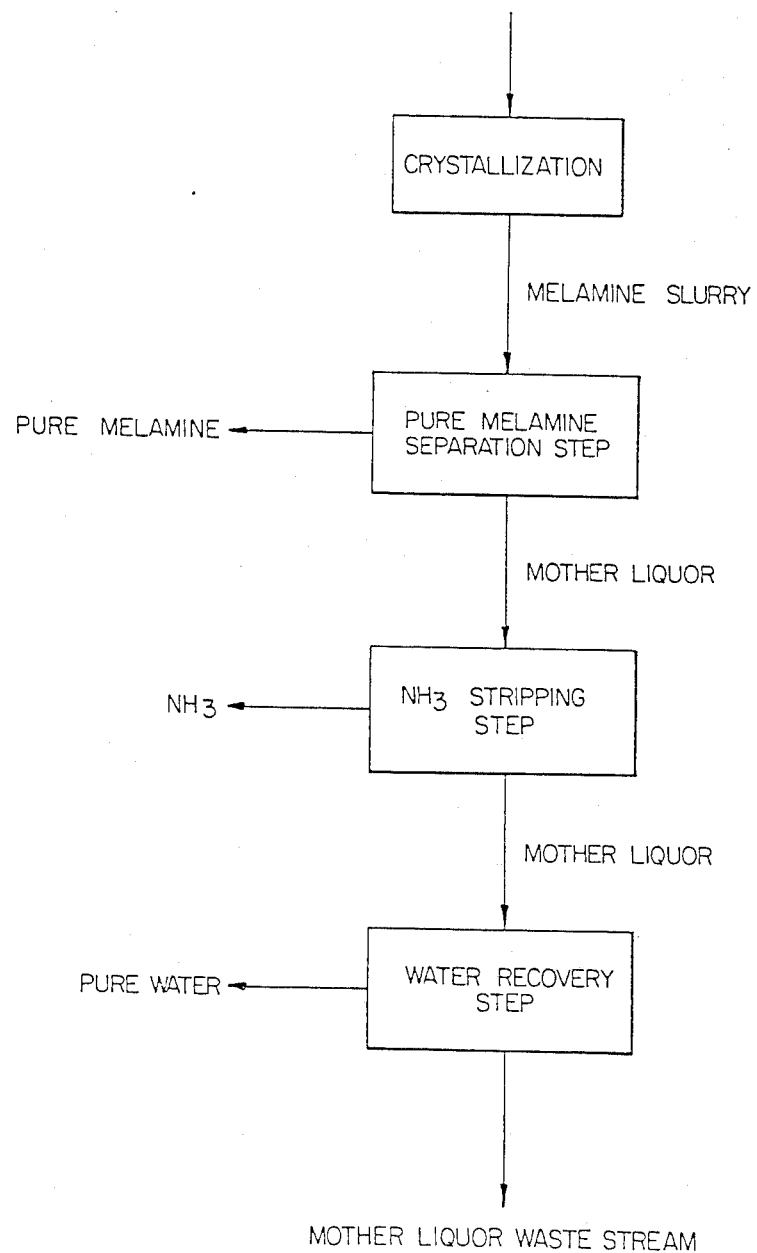

UTILIZATION OF MELAMINE WASTE EFFLUENT

This applicaiton is a division of application Serial No. 19,158, filed April 2, 1985, now No. 4,663,387.

BACKGROUND OF THE INVENTION

This invention relates broadly to the recovery of solid wastes from the effluent stream generated in the manufacture of melamine and, more particularly, to the preparation of resin compositions from the solid waste from the melamine industry, and to the use of such resin compositions as superplasticizers for admixture with concrete.

A major problem with most processes in the petrochemical industry is the contamination of the effluent streams with various chemicals, including unrecovered amounts of the primary product of the process. This is particularly important in the case of the melamine industry.

Melamine is manufactured on a commercial scale by converting urea to melamine in several stages, including a crystallization stage which purifies the melamine to the required specifications. The mother liquor following the crystallization stage is normally stripped of ammonia and concentrated to a solids content of about 1.5-5% by weight. This final effluent stream, which is usually disposed of as waste water, contains various proportions of melamine, oxyaminotriazines, cyanuric acid, melam, melan, melon, biuret, triuret, and other higher polycondensates of urea and melamine. These various components, the percentages of which vary depending on process conditions, are considered to be the major contributors to the pollution problems of melamine manufacturing plants. In addition to the pollution problems created by these waste solids, the actual tonnage of melamine lost in these waste solids is rather substantial. Accordingly, it would be most desirable from both an economic and ecological standpoint to recover the waste melamine and by-products in a commercially usable form.

The problem of recovering these waste materials has been dealt with by various melamine manufacturers and research organizations during recent years. For example, it has been demonstrated that the solid content in the effluent streams can be reduced by such varying techniques as biological hydrolysis, thermal hydrolysis, absorption on activated carbon, the production of cyanuric acid from wasted melamine, and the recovery of the various waste products by means of ion exchangers. While all of the above techniques can reduce somewhat the solid content of the waste effluent stream from a melamine process, none have been utilized commercially either because they are considered uneconomical or technically too complicated.

One such technique for reducing the melamine content in a waste effluent stream is taught in Kennedy, U.S. Pat. No. 3,496,176. In that patent, it is taught to adjust the pH of the mother liquor to 6-7, immediately after the ammonia stripper, by bubbling carbon dioxide in the effluent stream. In this manner, about 70-80% of the ammelide and ammeline, i.e., some of the by-products in the stream, are precipitated. The stream is then filtered to remove the precipitated solids and melamine is recrystallized from the filtrate. A similar procedure is disclosed in Dakli et al, U.S. Pat. No. 3,423,411 to precipitate oxyand oxyaminotriazines, except that in the recovery of melamine it was necessary to heat the filtrate and then pass the heated filtrate through a column of cationic exchange resins to remove other nitrogen-containing organic impurities and alkali ions. Still another technique for reducing the melamine content of the waste stream is discussed in Fujiyoshi, Japanese Pat. No. 50-26553. In that patent it is disclosed to blend the mother liquor from the melamine synthesis with cyanuric acid to precipitate melamine and melamine cyanurate.

Hoogendonk, U.S. Pat. No. 3,496,177, relates to a process for the purification of crude melamine by dissolving the crude melamine in water after adjusting the solution to a pH of 6-8, and then filtering at 105° C. The filtrate containing melamine is then adjusted to a temperature of 50° C. and crystallization of pure melamine is obtained. A similar procedure is disclosed in Rettler, German Pat. No. 1,162,379, except that after dissolving the crude melamine in water, the solution is treated with a strongly basic ion exchange resin at 70°-75° C. before the solution is filtered and the melamine recrystallized. Elmer et al, U.S. Pat. No. 2,863,869, discloses purifying melamine in an aqueous solution of sodium hydfoxide (pH 11.5-11.9) at 129°-141° C., filtering the solution, and then cooling to recrystallize the melamine.

It should be apparent from a review of the above and other known techniques for dealing with the problem of melamine plant waste that efforts have been concentrated in the areas of:

(1) the recovery of the melamine waste from the waste effluent and its purification to obtain high purity melamine;
(2) the recovery of the melamine waste from the waste effluent and its utilization as feed material for manufacturing cyanuric acid or melamine; and
(3) the treatment of the waste effluent as a pollutant and subjecting the effluent to biological treatment.

Heretofore there have been no successful efforts to convert the solid wastes, i.e., the melamine together with the various by-products, that are contained in the waste effluent into a commercially usable product, thereby improving the economics of the melamine synthesis plant while simultaneously reducing the plant's waste disposal problems.

SUMMARY OF THE INVENTION

It is an object of the present invention to provide an economically and ecologically desirable process for the recovering melamine and the by-products associated therewith from the waste effluent stream of a melamine process.

It is another object to reduce the solids content of a melamine process waste effluent so as to reduce the pollution problems associated with the disposal of such streams.

Still another object is to provide an economical process for preparing useful resin compositions from the waste melamine and by-products contained in the waste water from a commercial melamine synthesis plant.

Yet another object is to chemically treat the waste solids contained in the waste water stream from a melamine manufacturing process to form a water soluble resin composition which has a variety of commercial applications.

Still another object is to prepare a water soluble superplasticizing composition for use in concrete admixtures from the solids contained in the waste effluent from a melamine synthesis plant.

These and other objects and advantages of the present invention are accomplished by converting the waste melamine and by-product solids contained in the effluent stream of a melamine synthesis plant into water soluble resins which contain sulfonate groups. The conversion process may be carried out by the following sequence of steps:

(1) treating the waste solids from the waste water stream with an aldehyde, suitably formaldehyde, for example, in the form of a formalin solution (30–40%) at a temperature on the order of from about 40° C. to about 80° C. after adjusting the pH to about 11–13;

(2) treating the solution obtained in step (1) with a sulfonating agent, such as a metal sulfite, bisulfite or metabisulfite, at a temperature of from about 70° C. to about 90° C. for about 60 to about 180 minutes;

(3) polymerizing the reactive components of the solution from step (2) at a pH of about 1–5 and at a temperature on the order of from about 30° C. to about 80° C. for about 10 to about 150 minutes; and (4) stabilizing the resulting resin solution by heating the same at a pH of from about 7–10 and a temperature of from about 50° C. to about 100° C. for about to about 180 minutes.

The resulting sulfonated resin compositions are thermally stable water soluble materials that can be used effectively and economically in various applications such as, for example, as superplasticizers in concrete admixtures, as drilling mud additives, in adhesives, in soil conditioners and stabilizers, in slow release fertilizers, and as additives for the paper and textile industries.

BRIEF DESCRIPTION OF THE DRAWINGS

FIG. 2 is a schematic flow sheet and block diagram illustrating the last processing steps involved in a typical melamine manufacturing plant.

DETAILED DESCRIPTION

Figure 1:
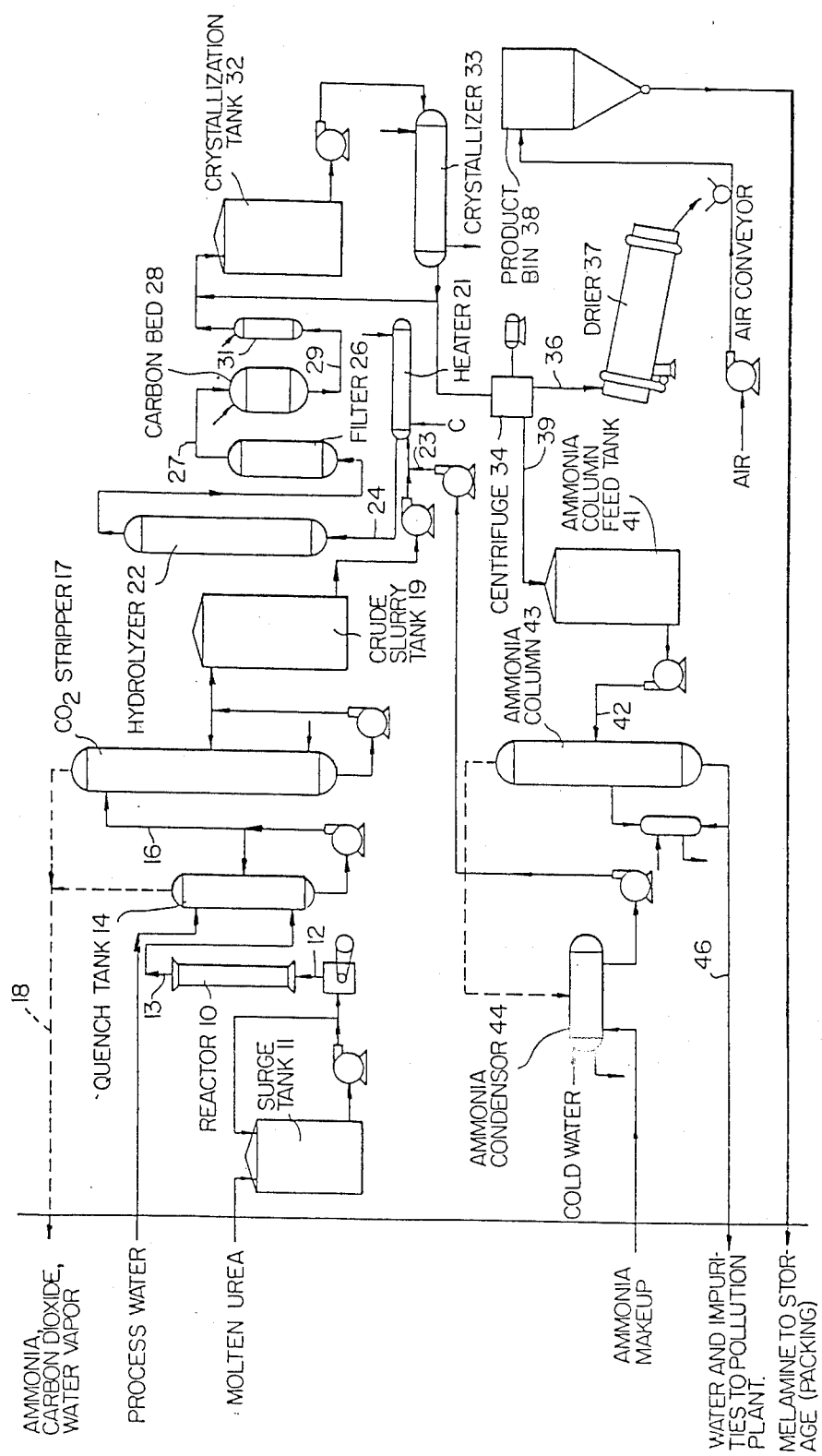
FIG. 1 is a schematic elevational view of a typical commercial high pressure melamine process plant.

In recent years, the prevailing method of producing melamine on a commercial scale has been based on urea as a starting material. The conversion of urea to melamine can take place either at high pressure (Scheme I) or at low pressure over a catalyst (Scheme II). See W. S. Fong, Melamine, Report No. 122, SRI International, Menlo, Park, CA (1978) and Melamine, Technical Leaflet: M5012, BASF (1970), both of which are incorporated herein by reference.

The reaction sequence for the high pressure (Scheme I) and low pressure (Scheme II) processes are as follows:

SCHEME I $$3(NH_2)_2CO \longrightarrow 3HOCN + 3NH_3 \tag{1}$$

urea      cyanic acid $$3HOCN \longrightarrow (NCOH)_3 \tag{2}$$

cyanuric acid $$(NCOH)_3 + 3NH_3 \longrightarrow C_3H_3N_3(NH_2)_3 + 2H_2O \tag{3}$$

melamine

SCHEME I -continued $$3(NH_2)_2CO + 3H_2O \longrightarrow 6NH_3 + 3CO_2 \tag{4}$$

SCHEME II $$6(NH_2)_2CO \xrightarrow{Catalyst} 6HOCN + 6NH_3 \tag{5}$$

cyanic acid $$6HOCN \longrightarrow 6HNCNH \text{ or } H_2NCN + 3CO_2 \tag{6}$$

carbodiimide
(cyanamide)

$$3H_2NCN \text{ or } 3HNCNH \longrightarrow C_3H_3N_3(NH_2)_3 \tag{7}$$

melamine

The temperatures at which the reaction must be carried out to obtain yields higher than 90% range between about 300° C. and 330° C. At lower temperatures, biuret and cyanuric acid are the main products. Melamine decomposes and deammoniates at temperatures above about 350° C., unless it is stabilized with excess ammonia. The rate of the reaction necessitates high temperatures; an optimum temperature range reported as being about 400° C. to about 430° C.

The theoretical conversion is about 0.35 kg of melamine, 0.28 kg of ammonia, and 0.37 kg of carbon dioxide per one kilogram of urea. In practice, however, the melamine yield is lower than that, about 90–95% of the theoretical yield. A rather wide variety of by-products form during the reaction, including biuret, triuret, cyanuric acid, melamine cyanurate, melam, melan, melon, ureaidotriazine, ammeline, ammelide, hydroxytriazine and oxiaminotriazine. The concentrations of these by-products depend to a large extent on reaction conditions.

The various commercial high pressure and low pressure catalytic processes are all similar in that they consist of three main sections or stages: melamine synthesis, melamine recovery, and off gas treatment and recovery. In all of these processes, the reaction is carried out at a temperature range on the order of about 350° C. to about 400° C. under ammonia to stabilize the melamine against decomposition. In the high pressure processes the reaction pressure is at least about 80 atmospheres, whereas in the low pressure catalytic process, the reaction pressure generally is from about 1 to about 10 atmospheres.

Referring to FIG. 1, there is shown a schematic diagram of a typical high pressure, liquid phase, non-catalytic process plant, wherein the reaction product is quenched with water to recover melamine, and ammonia and carbon dioxide are produced as by-products. The conversion of urea to melamine is carried out at about 400° C. and 136 atm (2,000 psig) in a cylindrical reactor 10 that has a central draft tube surrounded concentrically by a number of electrical bayonet heaters. Molten urea, fed from a surge track 11 into the reactor below the draft tube through line 12 circulates upward outside the draft tube and then downward inside the draft tube. The product effluent, withdrawn from the top section of the reactor through line 13 is charged into a quench tank 14 where it is cooled with process water. The resulting aqueous slurry is then fed through line 16 into the top of a carbon dioxide stripper 17 to produce an aqueous slurry of crude melamine. The off-gas from the quench tank and from the stripper are exported as by-products through line 18. The off-gas in line 18 contains ammonia, carbon dioxide and water vapor. The aqueous slurry of crude melamine from the stripper 17 is fed to a crude slurry tank 19, whereafter it is mixed with liquid ammonia and passed through a heater 21 and into a hydrolyzer 22. The liquid ammonia is mixed with slurry of crude melamine by adding the ammonia through line 23 adjacent the inlet of the heater 21 and the heater effluent is passed through line 24 into the hydrolyzer 22. By heating the slurry of crude melamine in the presence of ammonia, the melamine is dissolved and some of the impurities are hydrolyzed to insolubles such as hydroxytriazines. The overhead effluent from the hydrolyzer 22 is then passed through a filter 26 to remove the insolubles, and then through line 27 into an activated carbon bed 28 to remove color-causing matter. The solution is then passed via line 29 through another filter 31 before it is cooled in a recrystallization system comprised of the crystallization tank 32 and crystallizer 33 to recrystallize the melamine.

The recrystallized melamine, harvested by means of centrifuges 34, are fed through line 36 to a drier 37. The dried melamine product is then conveyed by air to appropriate product bins 38.

The mother liquor from the centrifuges 34 is fed through line 39 to an ammonia column feed tank 41, and from the feed tank 41 through line 42 to the ammonia column 43, to recover ammonia. The gaseous ammonia which is recovered as overhead from the ammonia column 43 is condensed and collected in the condenser 44 from which it is recycled for admixture with the slurry of crude melamine adjacent the inlet of heater 21. The bottoms from the ammonia column 43 comprises the waste water which contains the residual melamine and by-products which normally are fed to a pollution plant through line 46, but which now are to be treated and recovered in accordance with the present invention.

About 3.3 kg of urea and 0.1 kg of ammonia are reportedly consumed to produce 1.0 kg of melamine and 1.1 kg of ammonia by-product in the form of an ammonia-carbon dioxide-water mixture. The melamine yield is about 86.6% of the theoretical yield based on urea for this process.

The process described above in connection with FIG. 1 is the process known as the Allied Chemical melamine process. Other similar high pressure non-catalytic commercial processes are practiced by the Nissan Chemical and Montecatini Edison. Several companies have developed commercial low pressure catalytic processes and among them are Chemico-USS Chemical, Chemie Lenz, Stamicarbon, and BASF. Of these various known commercial processes for producing melamine the Stamicarbon process and the Chemie Lenz process employ a melamine recovery and purification section which are quite similar to section used in the hereindescribed Allied Chemical process. In the Nissan Chemical process, the liquid product from the reactor is aged, and then quenched with water and ammonia to produce an aqueous ammonia solution containing melamine. The purity of the product and yield depend upon the percentage of ammonia in the solution. The aqueous ammonia is then sent to a stripper where the ammonia is removed and the melamine is recovered from the solution by crystallization, centrifugation and drying.

In the BASF process, the reaction solution is passed through filters to remove waste solids, whereafter the filtrate is quenched and sent to a specially designed cyclone to separate the melamine.

In all of the known commercial processes, the waste water effluent from the melamine recovery and purification section contains residual melamine and various by-products which can be treated in accordance with the present invention. A block diagram illustrating the last processing steps involved in a typical melamine manufacturing plant is shown in FIG. 2, and an analysis of the waste solids contained in the mother liquor waste stream from that plant is shown in Table I. As shown in Table I, the waste solids in the mother liquor waste stream is composed of 20-30% by weight of oxyaminotriazines, 0.1-1.0% by weight of polycondensates, 70-75% by weight of melamine and 0-6% by weight of urea and urea polycondensates.

TABLE I

| ANALYSIS OF THE SOLID CONTENT OF THE WASTE WATER STREAM[e] | | |
|---|---|---|
| Composition of Effluent Stream | Sample 1[a] | Sample 2[a] |
| Total Solids | 3.37 g. | 1.80 g. |
| Melamine | 69.7% | 70.6% |
| Oxytriazines[b] | 29.7% | 23.3% |
| Polycondensates[c] | 0.6% | 0.5% |
| Others[d] | — | 5.6% |

[a]Samples taken at different intervals of plant operation.
[b]Oxytriazines include ammeline, ammelide and cyanuric acid.
[c]Polycondensates include mainly melam, melan, and melon.
[d]Urea and urea polycondensates.
[e]At present, complete analysis and exact determination of the concentration of each compound found in the waste solid, such as ammeline, ammelide, melam, melon, etc., is difficult. Present analytical procedures provide only the percentages for melamine, the oxyaminotriazines (ammeline, ammelide, and cyanuric acid, collectively) and the polycondensates (melam, melem, melon, etc., collectively).

The melamine and by-products are, for the most part, contained in the mother liquor waste stream in colloidal form.

According to the present invention, the mother liquor, preferably after the water recovery step shown in FIG. 2, is processed to separate as much of the solids content as possible within the bounds of economics. This separation can be accomplished, for example, by filtering, centrifuging or sedimenting the mother liquor waste stream directly, or by first treating the stream with a flocculating agent such as sulfuric acid, carbon dioxide or other flocculating agents commonly used in water treatment, and then filtering, centrifuging or sedimenting. By using the above separation techniques, the solids would be separated in the form of a paste having a variable water content which could be controlled, for example, by subsequent mechanical or thermal drying processes. Alternatively, the solids content of the mother liquor waste stream could be separated by spray drying or by evaporating the water therefrom completely or partially.

The solid or paste obtained through the above procedure is then reacted with an aldehyde, preferably formaldehyde, in a multistep process which results in the formation of stable water soluble resinous materials that are suitable for use in a variety of applications, such as in drilling muds, adhesives, molding and laminate compounds, and paper and textile treating compounds. The resinous materials prepared in accordance with this invention are particularly well suited for use as superplasticizing agents which impart improved workability and flowability to concrete admixtures.

The water soluble resinous materials of the present invention are prepared by reacting the melamine and by-product-containing paste or solids obtained from the mother liquor waste stream with the aldehyde in the following sequence of steps:

(a) a solution of the aldehyde, preferably formaldehyde, having a concentration on the order of from about 30% to about 40% by weight is adjusted to a pH value of from about 11.0 to about 13.0 by the addition of aqueous alkali metal hydroxide. The alkaline solution is heated to about 40° C.–80° C. and a quantity of the waste solids or paste is added to the solution such that the ratio of waste solids:aldehyde is in the range of from about 0.8:1 to about 1.6:1. The mixture is maintained at the above temperatures for a period of from about 10 to about 60 minutes while being agitated;

(b) to the above solution, a sulfonating agent such as an alkali metal sulfite, bisulfite or metabisulfite is added such that the molar ratio of aldehyde to sulfite group is from about 2.5:1 to about 5.0:1, and the temperature of the reaction mass is raised to from about 70° C. to about 90° C. and maintained at that temperature for about 60 to 180 minutes. During this period, the pH of the reaction mass is maintained in the range of from about 11.0 to about 13.0 by adding an alkaline hydroxide, preferably an alkali metal hydroxide solution as necessary;

(c) the temperature of the solution from step (b) is then readjusted to about 30° C.–80° C. and an acid solution, preferably a sulfuric acid solution, is added to lower the pH to about 1.0–5.0. The reaction mass is then kept under these conditions with continuous agitation for about 30 to 180 minutes;

(d) the pH of the reaction mass is then raised to about 7.0 to about 10.0 and the temperature is adjusted to about 50° C.–100° C. The reaction mass is maintained under these conditions with constant agitation for about 30 to 180 minutes, whereafter the reaction mass is cooled to ambient temperatures, adjusted to a pH of about 8.0–13.0, and diluted to a solids content as required for the intended application. Usually, a solids content of from about 5%–50% is desired, with amounts ranging from about 10%–30% by weight being preferred for superplasticizer applications.

The invention will be more fully understood in light of the following examples, all of which are given for illustrative purposes only and not for the purposes of limiting the scope of this invention.

EXAMPLE 1

A ten liter sample of the mother liquor waste water stream of a melamine manufacturing plant was heated at 110° C. until all of the water evaporated. The weight of the remaining solid was found to be 180 g. A sample of this solid was analyzed by standard spectrophotometric and gravimetric analytical techniques to determine the percentages of polycondensates, oxyaminotriazines and urea condensates. The results were found to be 0.5%, 23.3% and 5.6%, respectively. The remaining components of the solid is melamine which amounts to 70.6%.

EXAMPLE 2

A one liter sample of the mother liquor waste water stream of a melamine manufacturing plant was heated at 110° C. until all of the water evaporated. The weight of the solid remaining following evaporation is 21.5 g. The elemental composition of this solid was determined by standard analytical techniques to be as follows: N, 60.04%; C 30.48%; H, 4.49%. The theoretical elemental composition for melamine is: N, 66.6%; C, 28.57%; H, 4.76%, and that for ammeline is: N, 55.12%; C, 28.35%; H, 3.94%.

EXAMPLE 3

A ten liter sample of the mother liquor from a typical melamine manufacturing plant was filtered to recover the solids content therefrom. The solids were analyzed and were found to contain approximately 69.7% by weight of melamine, 29.7% by weight of oxytriazines (ammeline, ammelide, and cyanuric acid, collectively), and 0.6% by weight of polycondensates (melam, melem, melon, etc., collectively). A quantity of paraformaldehyde (94.6% formaldehyde by weight) weighing 50.34 g. was mixed with 230 ml of water which was made basic by the addition of NaOH solution, and was heated at 55° C. for 30 minutes with continuous agitation. The pH of the solution was adjusted to 12.00 and an additional quantity of water (88 ml) was added. The solution temperature was adjusted to 45° C. and 50 g. of the solid obtained from the mother liquor was added. Agitation was continued for 15 minutes. A quantity of 37.7 g. of sodium metabisulfite and 12 ml of water were then added to the reaction solution. The reaction was continued at 78° C. for 120 minutes. The temperature was then lowered to 45° C. and the pH was adjusted to 3.0 by adding 30 ml of $H_2SO_4$ (14.5 molar). The reaction solution was agitated under these conditions for 60 minutes, then its pH was raised to 7.0 using NaOH solution and the temperature was raised to 78° C. with continuous agitation. The solution was kept under these final conditions for 60 minutes. The solution was diluted to 20% resin content after adjusting its pH to 11.0 and its viscosity at 20° C. was found to be 3.7 cp. A sample of the above solution was found to be very stable compared to commercial sulfonated melamine formaldehyde products at 60° C.

EXAMPLE 4

A formalin solution was prepared in a manner analogous to that described in Example 3. The pH of the solution was adjusted to 12.0 and 88 ml of water were added. Keeping the temperature of the solution at 55° C., 50 g. of the solid obtained from the mother liquor of Example 1 was added and agitated for 15 minutes. A quantity of 37.7 g. of sodium metabisulfite and 12 ml of water were then added to the reaction solution. The solution was heated to 78° C. and kept at this temperature for 120 minutes with constant stirring, then the temperature was lowered to 70° C. and the pH to 3.0. The reaction solution was agitated under these conditions for 150 minutes, then the pH was raised to 7.0 and the temperature to 78° C. for 60 minutes. The final solution was adjusted to pH 10.5 and its solid content was 26.4%. The viscosity of final solution after dilution to 20% solid content at 20° C. was found to be 5.6 cp.

EXAMPLE 5

The resin solution prepared according to Example 3 was found to be a cement superplasticizer. The resin solution was examined according to ASTM C-187-79, C-109-79 and C-191-79, to determine its effect on water/cement ratio, compressive strength, and setting times, respectively. The results of these tests in comparison with analogous tests done on neat cement mortar mix, as well as on a mix containing a commercial melamine-based superplasticizer[1], are shown in Table 2. The results indicate that for the same slump[2] of 15.5±0.5 cm, a compressive strength improvement of 37% over the results obtained for the neat mix is found when 3% of the resin solution by weight of cement is used.

[1] Melment L-10, sold by Suddeutsche Kalkstickstoff-Werk AG, of Trostberg, Germany.
[2] The flowability of concrete is measured by standard tests such as ASTM C143, "Slump of Portland Cement Concrete." According to ASTM C143, the concrete mix is placed, as soon as it is prepared, in a standard conically shaped container. The container is then removed, allowing the fresh concrete mix to flow. The difference between the height of the mix before and after flow is called "slump" and the higher the flowability of a concrete mix, the larger the value of its slump. The value of slump is usually given in millimeters (mm) or inches (in).

TABLE 2

PROPERTIES OF RESIN SOLUTION OF EXAMPLE 3 AS ADDITIVE FOR CEMENT MORTAR

|  | % Weight of Admixture Solution Weight of Cement | Water Cement | Water Reduction (%) | Setting Time (min) | | Compressive Strength (kg/cm$^2$) | | | |
| --- | --- | --- | --- | --- | --- | --- | --- | --- | --- |
|  |  |  |  | Initial | Final | 1 day | 3 days | 7 days | 28 days |
| Neat | — | 0.23 | 0.0 | 180 | 240 | 85 | 167 | 228 | 303 |
| Resin of Example 3 | 1.0 | 0.215 | 6.5 | 165 | 180 | — | — | — | — |
|  | 3.0 | 0.185 | 19.6 | 225 | 240 | 115 | 213 | 264 | 416 |
|  | 5.0 | 0.165 | 28.3 | 345 | 360 | — | — | — | — |
| Commercial Super-plasticizer | 1.0 | 0.22 | 4.35 | 180 | 205 | — | — | — | — |
|  | 3.0 | 0.185 | 19.6 | 225 | 240 | 171 | 254 | 288 | 412 |
|  | 5.0 | 0.16 | 30.4 | 270 | 285 | — | — | — | — |

EXAMPLE 6

The properties of the resin solution prepared by Example 3 as a concrete additive were studied. A concrete mix consisting of cement 385 parts, water 205 parts, sand (zone 3) 625 parts, aggregate (10 mm) 395 parts, aggregate (20 mm) 795 parts and 11.55 parts of resin solution from Example 3 was prepared. This was compared with a similarly prepared neat mix containing no resin and with a mix containing 11.55 parts of the commercial melamine-based concrete superplasticizer liquid Melment L-10 having 20% solid content. The results of these tests are shown in Table 3.

TABLE 3

COMPRESSIVE STRENGTHS DATA OF CONCRETE - NEAT, WITH RESIN SOLUTION OF EXAMPLE 3, AND WITH A COMMERCIAL SUPERPLASTICIZER

|  | Slump (mm) | Water reduction (%) | Compressive strength (kg/cm$^2$) | | | |
| --- | --- | --- | --- | --- | --- | --- |
|  |  |  | 1 day | 3 days | 7 days | 28 days |
| Neat | 51 | 0 | 126 | 239 | 268 | 357 |
| 3% Resin of Example 3 | 60 | 29 | 936 | 381 | 515 | 615 |
| Commercial Superplasticizer | 40 | 29 | 241 | 373 | 457 | 531 |

EXAMPLE 7

The stability of the resin solution prepared according to Example 3 was compared with a commercial melamine-based concrete superplasticizer, Melment L-10. The resin solution prepared according to this invention showed greater stability, i.e., smaller changes in pH and viscosity, in comparison with the commercial sample, when subjected to a constant temperature of 60° C. for 14 days. These results are shown in Table 4.

TABLE 4

COMPARISON OF THE STABILITY OF pH AND VISCOSITY OF PREPARED RESIN OF EXAMPLE 3 AND COMMERCIAL MELAMINE-BASED RESIN

| Time (days) | Resin Solution of Example 3 | | Commercial Resin Solution | |
| --- | --- | --- | --- | --- |
|  | pH | Viscosity (cp) | pH | Viscosity (cp) |
| 0 | 10.99 | 3.70 | 11.30 | 4.27 |
| 2 | 10.38 | 3.68 | 9.40 | 3.92 |
| 6 | 9.90 | 3.64 | 8.90 | 3.13 |
| 8 | 9.85 | 3.68 | 8.99 | 2.88 |
| 10 | 9.63 | 3.83 | 8.80 | 2.76 |
| 14 | 9.31 | 4.05 | 8.75 | 2.72 |
| Percent Change from Initial Value | 15.37% | 9.5% | 22.6% | 36.3% |

While the invention has been described herein in connection with certain embodiments and certain structural and procedural details, it is clear that changes, modifications or equivalents can be envisioned by those skilled in the art; accordingly, such changes within the principles of the invention are intended to be included within the scope of the claims below.

What is claimed is:

1. A method of improving the workability and stength of concrete mixes which comprises adding to a concrete mixture comprised of portland cement, water, and at least one member selected from the group consisting of sand and aggregate, an effective amount of the thermally stable water soluble resin solution containing melamine, oxy triazines and polycondensates prepared from the mother liquor effluent stream from a melamine manufacturing plant by a process which comprises:
   (a) treating the waste solids from the effluent stream with an aldehyde solution at a temperature of about 40° C.–80° C. after adjusting the pH of said solution to about 110°–13.0;
   (b) sulfonating the solution from the preceding step at a temperature of aobut 70° C.–90° C. for about 60 to 180 minutes with a sulfonating agent selected from the group consisting of alkali metal sulfites, alkali metal bisulfites and alkali metal metabisulfites;
   (c) polymerizing the reactive components contained in the sulfonated solution for the preceding step at a pH of 1.0–5.0 and at a temperature of 30° C.–80° C. for about 10 to about 150 minutes; and
   (d) stabilizing the resulting resin solution by heating the same at a pH of about 7.0–10.0 and at a temperature of about 50° C.–100° C. for about 30 to 180 minutes.

2. A method of improving the workability and strength of concrete mixes which comprises adding to a concrete mixture comprised of portland cement, water and at least one member selected from the group consisting of sand and aggregate an effective amount of the thermally stable water soluble resin solution containing melamine, oxy triazines and poly condensates prepared from the mother liquor effluent stream from a melamine manufacturing plant by a process which comprises:

(a) treating the waste solids from the effluent stream with a formaldehyde solution wherein the weight ratio of waste solids to formaldehyde is from about 0.8:1 to about 1.6:1. at a temperature of about 40° C.–80° C. after adjusting the pH of said solution to about 11.0–13.0, and cooling said solution to ambient temperature;

(b) sulfonating the solution from the preceding step at a temperature of about 70° C.–90° C. for about 60 to 180 minutes with a sulfonating agent selected from the group consisting of alkali metal sulfites, alkali metal bisulfites and alkali metal metabisulfites wherein the molar ratio of formaldehyde to sulfite groups is form about 2.5:to about 5.0:1;

(c) polymerizing the reactive components contained in the sulfonated solution of the preceding step at a pH of 1.0–5.0 and at a temperature of 30° C.–80° C. for about 10 to about 150 minutes; and (d) stabilizing the reaulting resin solution by heating the same at a pH of about 7.0–10.0 and at a temperature fo about 50° C.–100° C. for about 30 to 180 minutes, sand diluting said stabilizied resin solution to a solids concentration on the order of about 10–30% by weight.

3. A concrete mixture comprising cement, water, at least one member selected from the group consisting of sand and aggregate, and from about 1% to about 5% by weight of a thermally stable resin solution containing melamine, oxy triazines and poly condensates prepared from the mother liquor effluent stream from a melamine manufacturing plant by a process which comprises:

(a) treating the waste solids from the effluent stream with an aldehyde solution at a temperature of about 40° C.–80° C. after adjusting the pH of said solution to about 11.0–13.0;

(b) sulfonating the solution from the preceeding step at a temperature of about 70° C.–90° C. for about 60 to 180 minutes with a sulfonating agent selected from the group consisting of alkali metal sufites, alkali metal bisulfites and alkali metal metabisulfites;

(c) polymerizing the reactive components contained in the suflonated solution of the preceding step at a pH of 1.0–5.0 and at a temperature of 30° C.–80° C. for about 10 to about 150 minutes; and (d) stabilizing the resulting resin solution by heating the same at a pH of about 7.0–10.0 and at a temperature of about 50° C.–100° C. for about 30 to 180 minutes.

4. A concrete mixture comprising cement, water, at least one member selected from the group consisting of sand and aggregate, and from about 1% to about 5% by weight of a thermally stable resin solution containing melamine, oxy triazines and poly condensates prepared from the mother liquor effluent stream from a melamine manufacturing plant by a process which comprises:

(a) treating the waste solids from the effluent stream with a formaldehyyde solution wherein the weight ratio of waste solids to formaldehyde is form about 0.8:1 to about 1.6:1, at a temperature of about 40° C.–80° C. after adjusting the pH of said solution to about 11.0–13.0, and cooling said solution to ambient temperature;

(b) sulfonating the solution from the preceding step at a temperature of about 70° C.–90° C. for about 60 to 180 minutes with a sulfonating agent selected from the group consisting of alkali metal sulfites, alkali metal bisulfites and alkali metal metabisulfites wherein the molar ratio of formaldehyde to sulfite groups is from about 2.5:1 to about 5.0:1;

(c) polymerizing the reactive components contained in the sulfonated solution of the preceding step at a pH of 1.0–5.0 and at a temperature of 30° C.–80° C. for about 10 to about 150 minutes; and (d) stabilizing the resulting resin solution by heating the same at a pH of about 7.0–10.0 and at a temperature of about 50° C.–100° C. for about 30 to 180 minutes, and diluting said stabilized resin solution to a solids concentration on the order of about 10–30% by weight.

* * * * *